July 21, 1953  M. A. RYAN  2,645,906
LIQUEFIED PETROLEUM GAS FUEL SYSTEM
Filed Jan. 2, 1951
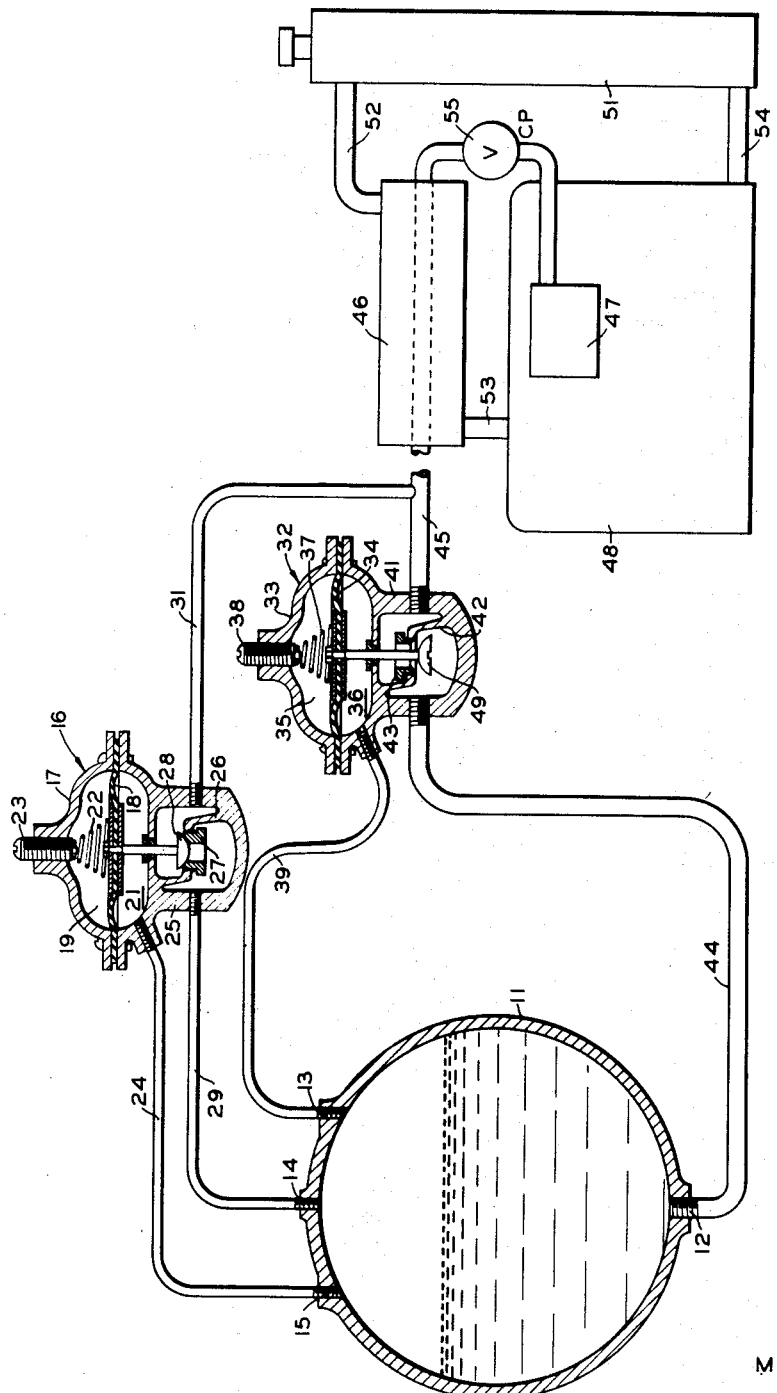
INVENTOR.
M. A. RYAN
BY
ATTORNEYS Patented July 21, 1953

2,645,906

UNITED STATES PATENT OFFICE 2,645,906

LIQUEFIED PETROLEUM GAS FUEL SYSTEM

Martin A. Ryan, Bartlesville, Okla., assignor to Phillips Petroleum Company, a corporation of Delaware Application January 2, 1951, Serial No. 203,968

2 Claims. (Cl. 62—1)

This invention relates to a liquefied petroleum gas (LPG) fuel system. In one of its more specific aspects, it relates to means for constantly providing a feed of LPG as fuel to an internal combustion engine. In another of its more specific aspects, it relates to a method for constantly providing a feed of LPG as fuel to an internal combustion engine. In another of its more specific aspects, it relates to pressure control means for LPG fuel systems.

During the past few years liquefied petroleum gas, generally comprising propane and butane, has come into considerable use as a fuel in internal combustion engines such as are used in buses and trucks. Use of this type of fuel in such vehicles has resulted in certain operational problems. One problem which has arisen is that of excess pressure within the fuel tank. Fuel systems of motor vehicles are, as is well known, subjected to considerable variations in temperature. As is well known, when high temperatures are encountered pressure of the LPG becomes so great as to present an operational hazard.

The normally gaseous hydrocarbons develop very high vapor pressures when subjected to high atmospheric temperatures. At times such high temperatures are encountered by reason of heat derived from the direct rays of the sun upon the fuel tank. The fuel is also heated at times by radiation of heat from a hot highway surface or from hot metal parts of the vehicle.

Some liquefied petroleum gas systems have been provided with pressure relief valves which allow a portion of the gas to be vented upon a build-up of an excessive pressure within the fuel tank. When liquefied petroleum gas is used in motor vehicles, it is hazardous to allow a portion of the gas to escape into confines of that vehicle for the reason that it is possible that such gases might be ignited, thus endangering the lives of personnel therein. A pressure relief valve is used in this device only as an ultimate safety feature. This feature is used in case of fire or when the motor is not running.

While overcoming the problem of excessive pressure in liquefied petroleum gas systems, a second problem has been encountered. The second problem is that of interrupted or fluctuating fuel flow resulting from attempts to control excessive pressure within the fuel tank. Some systems have been devised whereby excessive pressure within the fuel tank causes the flow of liquefied gas feed to be stopped and at the same time gaseous materials are removed from the top portion of the fuel tank and are fed to the system using that material as the fuel. As the gaseous material is removed from the fuel tank, additional liquefied fuel is allowed to vaporize thus removing heat of vaporization from the body of liquid within that tank. In this manner, the liquid is cooled and the vapor pressure is reduced. As the pressure in the fuel tank is reduced to such a degree that it is not excessive, flow of gaseous material through the vapor line is stopped and at the same time liquid fuel is once again released to flow to the burner or combustion system.

In order to obtain smooth operation of internal combustion engines, it is necessary to provide an overlap in the flow of gas and liquid fluids so that liquid fuel is allowed to flow before the gaseous fuel is cut off from the burner or combustion system. In the same manner, gaseous fuel is cut into the system before liquid fuel is cut out of the burner or combustion system.

An object of this invention is to provide an improved fuel feed system for internal combustion engines. Another object of the invention is to provide improved fuel feed balancing means. Another object of the invention is to provide an improved valve system for regulating flow of LPG to internal combustion engines. Another object of the invention is to provide a sensitive flow control valve system for an LPG fuel system. Another object of the invention is to provide improved means for controlling pressure in a liquefied petroleum gas fuel tank. Other and further objects and advantages will be apparent to those skilled in the art upon study of the accompanying disclosure and drawing.

Better understanding of this invention will be obtained upon reference to the drawing which is a schematic representation of an internal combustion engine and its LPG fuel supply and control system.

In the drawing, liquefied petroleum gas fuel tank 11 is provided with a liquid outlet 12 in its lower portion and gaseous material outlets 13, 14, and 15 in its upper end portion. Valve assembly 16 comprises a pressure chamber 17 which is preferably formed in two sections. In one preferred modification, this valve is provided with a diaphragm 18 which separates the pressure chamber into two sections 19 and 21. In another modification, this pressure chamber can be formed so as to allow a piston member to slide therein. In such a modification, the piston member divides the pressure chamber into two sections in a manner similar to that in which pressure chamber 17 is divided into two sections by diaphragm 18. Spring 22, with adjustment member 23, forms a pressure balance means which bears against one side of diaphragm 18. Adjustment member 23 comprises a threaded member which bears against one end of spring 22 so as to provide means by which the pressure of spring 22 against diaphragm 18 may be regulated. Gaseous material conduit 24 extends between gaseous material outlet 15 of fuel tank 11 and pressure chamber 17 on the side of diaphragm 18 opposite spring 22. Gas passage housing 25 forms a portion of valve assembly 16 and is provided with a wall 26 therein, which wall has an opening into which valve seat member 27 is secured. A passage is provided through valve seat member 27, thus providing the sole means for passage of gas through wall 26. Valve 28 is connected by its valve stem to diaphragm 18 and is, in its normal position, seated on valve seat 27 so as to prevent flow of gaseous material through the gas passage housing. Gaseous material conduit 29 extends between gaseous material outlet 14 of fuel tank 11 and the inlet side of gas passage housing 25. Gaseous material conduit 31 is connected to the outlet side of gas passage housing 25 and communicates with gaseous material conduit 29 through gas passage housing 25 only through the opening in valve seat member 27 when valve 28 is unseated. The area of diaphragm 18 is at least sixteen times greater than the cross-sectional area of the opening through valve seat member 27.

Valve assembly 32 is similar to valve assembly 16, having a pressure chamber 33 which is preferably divided into two sections by diaphragm 34 which separates the chamber into two sections 35 and 36. Pressure balance means comprises spring 37 and adjustment member 38. Spring 37 is provided on one side of diaphragm 34 and extends between that diaphragm and adjustment means 38 in the pressure housing. Conduit 39 extends between gaseous material outlet 13 in tank 11 and the section of pressure chamber 33 opposite that in which spring 37 is retained. Housing 41 which forms a portion of valve assembly 32 is provided with a wall member 42 which separates housing 41 into two sections. Valve seat member 43, having a passage extending therethrough, is secured in an opening through wall member 42, thus providing the sole communication between the two sections of the gas passage housing. Liquid feed conduit 44 extends between liquid outlet 12 in fuel tank 11 and the inlet side of housing 41. Conduit 45 extends from the outlet side of housing 41 through a vaporizer such as vaporizer 46 and is connected to carburetor 47 which in turn communicates with an internal combustion engine 48. Valve 49 is connected by its valve stem to diaphragm 34 and is open in its normal position, spring 37 exerting force in such a direction as to move valve 49 away from valve seat member 43. Diaphragm 34 has an area which is at least sixteen times that of the cross-sectional area of the opening through valve seat member 43.

In this specific schematic showing of the device of this invention, the vaporizer 46 is connected to radiator 51 by means of conduit 52 which extends from the upper portion of the radiator into the vaporizer chamber. Conduit 53 extends between vaporizer 46 and the water jacket of internal combustion engine 48 and conduit 54 extends between the lower portion of the water jacket within internal combustion engine 48 and the lower portion of radiator 51. Constant pressure valve 55 is provided in conduit 45 downstream of vaporizer 46 so to maintain a predetermined pressure downstream of the vaporizer. Conduit 31 is connected to conduit 45, preferably at a point upstream of vaporizer 46, but in all cases upstream of valve 55.

In the operation of this invention, the pressure balance means of valve assembly 32 is adjusted so as to maintain valve 49 in an unseated position at pressures which are no more than five pounds greater than that pressure which is required to overcome the resistance of spring 22 in valve assembly 16 so as to unseat valve 28. It is preferred to adjust the pressure balancing means of the two valves so that valve assembly 32 will prevent the flow of fuel therethrough only when the pressure in fuel tank 11 is two pounds or more greater than the pressure required to unseat valve 28 of valve assembly 16. As I have disclosed, the areas of diaphragms 18 and 34 are at least sixteen times greater than the areas of the openings through the valve seat members 27 and 43, respectively. By providing this great difference in area, the valves have good sensitivity and it is possible to obtain very close control of the valves by means of gas pressure applied to one side of the diaphragm.

As pointed out above, valve 49 of valve assembly 32 is unseated in its normal position by reason of the pressure exerted upon diaphragm 34 by spring 37. Thus liquid fuel flows through outlet 12 and conduit 44 through the opening in valve seat member 43 and through gas passage housing 41 into conduit 45. The liquid fuel is conveyed by conduit 45 through vaporizer 46. Water from the cooling system passes through vaporizer 46 in indirect heat exchange with the liquid fuel so as to vaporize that portion of the fuel. The cooling fluid is further cooled in the indirect heat exchange and in its cooled condition is introduced into the water jacket of internal combustion engine 48. Constant pressure valve 55 is adjusted so as to allow gaseous material to flow therethrough in such quantities as to provide a constant pressure downstream therefrom. The pressure of the gas downstream of constant pressure valve 55 is preferably slightly lower than atmospheric pressure, generally less than one pound below atmospheric pressure when the motor is running and intake manifold suction places a partial vacuum on carburetor 47. By having a sub-atmospheric pressure needed to pass LPG vapors through valve 55 a safety feature is provided because when the motor stops, the pressure in carburetor 47 becomes atmospheric, and the flow of LPG through valve 55 is automatically cut off. Air passes into the fuel system through carburetor 47 and its flow into the carburetor asperates the flow of gaseous fuel from conduit 45 into the carburetor. Cooling fluid which is heated during operation of the engine is withdrawn from the engine through conduit 54 and is reintroduced into radiator 51. Utilization of the device of this invention will allow considerable reduction in the size of radiator 51.

As pressure builds up within the fuel tank 11, gaseous material flows through conduits 24 and 39 so as to provide pressure to the undersides of diaphragms 18 and 34. As pointed out above, a pressure balance means of valve assembly 16 is so adjusted as to allow valve 28 to be unseated by pressure within fuel tank 11 while the same pressure within that tank fails to seat valve 49. If the temperature change in tank 11 is sufficiently great, pressure may continue to build up within that tank for a short period of time despite the removal of gaseous material from the tank through conduit 29, valve assembly 16 and conduit 31 to conduit 45. When the pressure build-up becomes great enough, i. e., up to five pounds more than that required to open valve assembly 16, the pressure applied to the bottom side of diaphragm 34 causes valve 49 to be seated, thus cutting off the flow of liquid fuel through valve assembly 32.

As the pressure within fuel tank 11 decreases, additional fuel is vaporized, thus providing a cooling effect upon the liquid fuel within that tank. As the pressure within fuel tank 11 decreases the pressure applied to the lower side of diaphragm 34 also decreases until the force applied by spring 37 to the upper side of diaphragm 34 is sufficient to unseat valve 49 from its valve seat 43. Thus liquid fuel is again allowed to flow through valve assembly 32 before the flow of gaseous material through valve assembly 16 is cut off. The vapor pressure within fuel tank 11 is further reduced by the continuing flow of gaseous material through valve assembly 16 until it is reduced sufficiently that it is overcome by the pressure of spring 22 which forces valve 28 into a closed position on its valve seat 27.

It will be seen upon study of this disclosure that at no time is there any possibility for the flow of fuel into the internal combustion engine in an interrupted manner. It requires a very small period for the vaporization of liquid fuel to such an extent that it is available for use as fuel in an internal combustion engine. However, where a flow of gas is cut off at the same time that liquefied gas fuel is introduced to a vaporizer, there is a sufficient interruption in the flow of properly vaporized fuel to the engine to cause uneven or fluctuating operation or power output therefrom. Such faulty operation is completely overcome by the device of this invention.

Although I have described this invention particularly in connection with a vaporizer which utilizes the coolant fluid of the engine as the heat transfer medium, any type of vaporizer may be used, one such vaporizer being one in which the engine manifold is utilized to provide the heat of vaporization for the liquid fuel.

Many modifications of this invention will be apparent to those skilled in the art upon study of the accompanying disclosure and the drawing. It is believed that such modifications are within the spirit and the scope of this disclosure.

I claim:

1. An improved liquefied petroleum gas fuel system comprising in combination a liquefied petroleum gas storage vessel; a first pressure actuated valve assembly comprising a first fluid passage chamber having a wall therethrough which separates said first fluid passage chamber into two sections, a first valve seat member affixed in said wall and having a fluid passage extending through said first valve seat member and said wall from one first fluid passage section to the other, a first valve normally seated on said first valve seat member, a first pressure chamber mechanically connected to said first fluid passage chamber, first pressure responsive actuator means mounted in said first pressure chamber and connected to said first valve, first adjustable pressure balance means mounted in said first pressure chamber and adapted to exert force against one side of said first pressure responsive actuator means so as to urge said first valve closed against said first valve seat member; first gas conduit means extending from the top side of said storage vessel to said first pressure chamber and adapted to provide gas under pressure against one side of said first pressure responsive actuator means so as to urge said first valve away from said first valve seat member; second gas conduit means extending between the top side of said storage vessel and a first section of said first fluid passage chamber; a second pressure actuated valve assembly comprising a second fluid passage chamber having a wall therethrough which separates said second fluid passage chamber into two sections, a second valve seat member affixed in said wall and having a fluid passage extending through said second valve seat member and said wall from one fluid passage section therein to the other, a second valve normally unseated from said second valve seat member, a second pressure chamber mechanically connected to said second fluid passage chamber, second pressure responsive actuator means mounted in said second pressure chamber and connected to said second valve, second adjustable pressure balance means mounted in said second pressure chamber and adapted so as to exert a greater force against one side of said second pressure responsive actuator means than is exerted by said first pressure responsive means so as to urge said second valve away from said second valve seat member; third gas conduit means extending between the top side of said storage vessel and one side of said second pressure responsive actuator means so as to urge said second valve closed against said second valve seat member; fourth conduit means extending between the bottom side of said storage vessel and a first section of said second fluid passage chamber; a vaporizer; fifth conduit means extending from the second section of said second fluid passage chamber through said vaporizer to an internal combustion engine; a constant pressure valve in said fifth conduit means downstream of said vaporizer; and sixth conduit means connected between the second section of said first fluid passage chamber and said fifth conduit means upstream of said constant pressure valve.

2. The fuel system of claim 1, wherein said first pressure responsive actuator means comprises a diaphragm which divides said first pressure chamber into two sections, the ratio of cross-sectional area of said diaphram to cross-sectional area of the fluid passage extending through said first valve seat member is at least 16:1; and said second pressure responsive actuator means comprises a diaphragm which divides said second pressure chamber into two sections, the ratio of cross-sectional area of said diaphragm to cross-sectional area of the fluid passage extending through said second valve seat member is at least 16:1.

MARTIN A. RYAN.

References Cited in the file of this patent

UNITED STATES PATENTS

| Number | Name | Date |
| --- | --- | --- |
| 2,226,810 | Ensign et al. | Dec. 31, 1940 |
| 2,315,881 | Thomas | Apr. 6, 1943 |
| 2,409,611 | Bodine | Oct. 22, 1946 |